United States Patent

Filo et al.

[19]

[11] Patent Number: 5,902,167

[45] Date of Patent: May 11, 1999

[54] SOUND-TRANSMITTING AMUSEMENT DEVICE AND METHOD

[75] Inventors: Andrew S. Filo, Cupertino; David G. Capper, Novato, both of Calif.

[73] Assignee: Sonic Bites, LLC, Novato, Calif.

[21] Appl. No.: 08/948,715

[22] Filed: Oct. 10, 1997

Related U.S. Application Data

[60] Provisional application No. 60/058,277, Sep. 9, 1997.

[51] Int. Cl.[6] ........................................... A63H 5/00
[52] U.S. Cl. ........................... 446/81; 446/404; 446/397; 426/104; 426/134
[58] Field of Search ............................. 446/81, 404, 484, 446/71, 397; 426/134, 135, 104

[56] References Cited

U.S. PATENT DOCUMENTS

| 1,189,897 | 7/1916 | Wilkes . |
| 1,986,955 | 1/1935 | Bedell . |
| 2,799,587 | 7/1957 | Schwartz . |

(List continued on next page.)

FOREIGN PATENT DOCUMENTS

| 0881989 | 6/1980 | Benelux TM/Des. Off. . |
| 2339543 | 2/1975 | Germany . |
| 26 29 968 | 7/1977 | Germany . |
| 30 30 132 | 3/1982 | Germany . |
| 295 14 759 | 2/1996 | Germany . |
| 51-94218 | 8/1976 | Japan . |
| 63-118868 | 8/1988 | Japan . |
| 4-19226 | 2/1992 | Japan . |
| 4-158812 | 6/1992 | Japan . |
| 4-66975 | 6/1992 | Japan . |
| 5-39286 | 5/1993 | Japan . |
| 6-151 | 1/1994 | Japan . |
| 8-80242 | 3/1996 | Japan . |
| 8-195994 | 7/1996 | Japan . |
| 3034501 | 2/1997 | Japan . |
| 3035669 | 3/1997 | Japan . |
| WO 88/10489 | 12/1988 | WIPO . |
| WO 94/17691 | 8/1994 | WIPO . |
| WO 95/19678 | 7/1995 | WIPO . |

OTHER PUBLICATIONS

Magazine Page, Aug. 1958.
U.S. Patent Application Serial No. 08/961,647 of Andrew S. Filo and David G. Capper for "Sound–Transmitting Amusement Device and Method" filed Oct. 31, 1997.
U.S. Patent Application Serial No, 08/966,401 of Andrew S. Filo and David G. Capper for "Sound Recording and Playback System" filed Nov. 7, 1997.
U.S. Patent Application Serial No. 08/984,004 of Andrew S. Filo and David G. Capper for "Denta–Mandibular Sound–Transmitting System" filed Dec. 3, 1997.
PCT Application No. PCT/US97/21870 of Nadrew S. Filo and David G. Capper for "Sound–Transmitting Amusement Device and Method" filed Nov. 26, 1997.
PCT International Search Report in PCT Application No. PCT/US97/21870 of Andrew S. Filo and David G. Capper for "Sound–Transmitting Amusement Device and Method" filed Nov. 26, 1997 (copy enclosed).
Rockin' Pop Candy handle and lollipop, © 1994 Cap Toys Inc., Cleveland, OH 44146 (submitting actual product and three photographs of the product showing a front view, a top view without a lollipop and a top view with a lollipop).

*Primary Examiner*—Robert A. Hafer
*Assistant Examiner*—Jeffrey D. Carlson
*Attorney, Agent, or Firm*—Kolisch, Hartwell, Dickinson, McCormack & Heuser

[57] ABSTRACT

A device and method for transmitting sound waves between a signal source and a user's ears, wherein the sound waves bypass the air. The invention generally comprises an edible substance and a signal source operatively associated with the edible substance and configured to produce sound waves for transmission through the edible substance to a user's mouth, from which they are conducted by teeth and bones to the user's ears to be perceived as sound. The signal source may produce sound waves directly, or it may do so with the assistance of a transducer. The invention provides for the construction of a nearly limitless number of novel amusement devices that simultaneously combine appeal to taste and sound.

12 Claims, 3 Drawing Sheets

U.S. PATENT DOCUMENTS

| | | |
|---|---|---|
| 2,800,825 | 7/1957 | Toussaint . |
| 2,977,425 | 3/1961 | Cole . |
| 3,122,959 | 3/1964 | Barr . |
| 3,184,587 | 5/1965 | Quijada . |
| 3,290,157 | 12/1966 | Schwartz et al. . |
| 3,627,161 | 12/1971 | Wergeland . |
| 3,875,932 | 4/1975 | Wachspress . |
| 3,985,977 | 10/1976 | Beaty et al. . |
| 4,071,110 | 1/1978 | Payne . |
| 4,150,262 | 4/1979 | Ono . |
| 4,520,238 | 5/1985 | Ikeda . |
| 4,555,697 | 11/1985 | Thackrey . |
| 4,612,915 | 9/1986 | Hough et al. . |
| 4,670,820 | 6/1987 | Eddins et al. . |
| 4,744,013 | 5/1988 | Lee et al. . |
| 4,744,124 | 5/1988 | Wang et al. . |
| 4,765,465 | 8/1988 | Yamada et al. . |
| 4,791,673 | 12/1988 | Schreiber . |
| 4,914,748 | 4/1990 | Schlotter, IV et al. . |
| 4,944,704 | 7/1990 | Grace . |
| 4,982,434 | 1/1991 | Lenhardt et al. . |
| 5,033,999 | 7/1991 | Mersky . |
| 5,079,679 | 1/1992 | Chin-Fa . |
| 5,125,866 | 6/1992 | Arad et al. . |
| 5,165,131 | 11/1992 | Staar . |
| 5,209,692 | 5/1993 | Coleman et al. . |
| 5,280,524 | 1/1994 | Norris . |
| 5,302,403 | 4/1994 | Cook et al. . |
| 5,313,557 | 5/1994 | Osterhout . |
| 5,323,468 | 6/1994 | Bottesch . |
| 5,352,470 | 10/1994 | Yang . |
| 5,391,107 | 2/1995 | Coleman . |
| 5,447,489 | 9/1995 | Issalene et al. . |
| 5,455,842 | 10/1995 | Mersky et al. . |
| 5,471,373 | 11/1995 | Coleman et al. . |
| 5,474,486 | 12/1995 | Chilton et al. . |
| 5,536,054 | 7/1996 | Liaw . |
| 5,536,196 | 7/1996 | Sternberg . |
| 5,572,762 | 11/1996 | Scheiner . |
| 5,579,284 | 11/1996 | May . |
| 5,681,200 | 10/1997 | Shecter . |
| 5,686,130 | 11/1997 | Yang . |
| 5,704,087 | 1/1998 | Strub . |
| 5,706,251 | 1/1998 | May . |
| 5,740,254 | 4/1998 | Thompson et al. . |

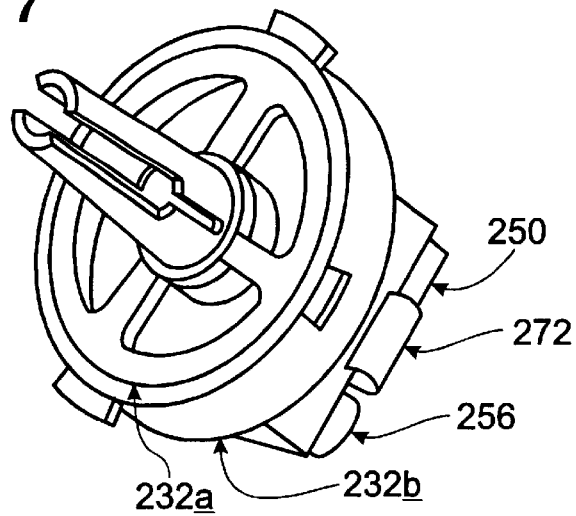
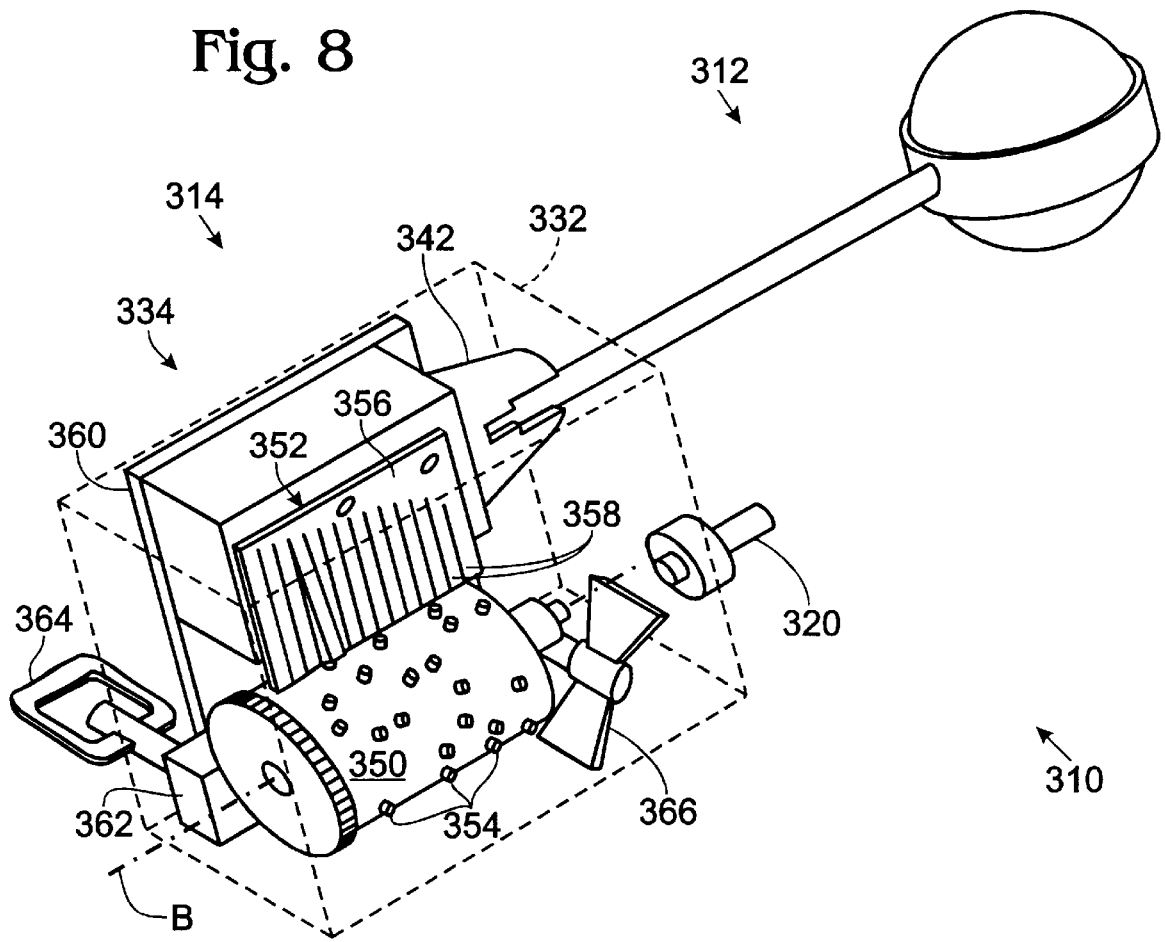

SOUND-TRANSMITTING AMUSEMENT DEVICE AND METHOD

CROSS REFERENCE TO RELATED APPLICATIONS

This application is based upon and claims the benefit under 35 U.S.C. § 119 of U.S. Provisional Application Ser. No. 60/058,277, filed Sep. 9, 1997, which is incorporated herein by reference.

TECHNICAL FIELD

This invention relates to sound-transmitting devices and methods. More particularly, it relates to devices and methods for transmitting sound waves from a signal source through an edible substance to a user's mouth, from which the sound waves travel through the user's teeth and bones to the user's ears to be perceived as sound.

BACKGROUND OF THE INVENTION

Amusement devices delight and entertain by appealing to the senses in novel and unexpected ways. For example, a figure may spring out of a jack-in-the-box at the end of a song, providing a visual surprise after a period of auditory stimulation. Alternatively, an aerial fireworks display may conclude with a loud bang, providing an auditory surprise after a period of visual stimulation.

Although novelty is fundamental to amusement devices, generating novelty is difficult because humans perceive their environment through a limited number of senses, namely sight, hearing, taste, smell, and touch. Yet, a successful amusement device should employ a novel combination of these senses, and it should appeal to that combination in a novel way.

Amusement devices most commonly appeal to sight and hearing, as with the jack-in-the-box and fireworks. Amusement devices less commonly appeal to other senses, such as taste. The relatively few amusement devices relating to edible substances primarily have combined appeal to taste with appeal to sight and/or touch. For example, a few patents have disclosed lollipop holders that cause a lollipop to jiggle, wobble, or spin. These devices combine the taste of the lollipop with the amusing sight and feel of a moving lollipop. Others have developed various mechanical or electrical candy dispensers.

Even less common are amusement devices that combine appeal to taste with appeal to hearing. Nevertheless, one patent has disclosed an amusement device that simultaneously appeals to taste, hearing, and sight. In this device, a lollipop holder plays preprogrammed sounds using a standard speaker integrated into the holder. The lollipop holder also flashes pulses of light that are synchronized with the sounds.

Despite their novelty in combining appeal to taste with appeal to other senses, each of the amusement devices described above has significant shortcomings. For example, although these devices appeal to a variety of senses, they generally do so in simple and repetitive ways, such as spinning a lollipop or dispensing a piece of candy. Yet, an amusement device designed to appeal to a variety of senses should offer complex stimulation, not mindless repetition. More importantly, each of the devices described above appeals to the senses in very conventional ways. For example, the device that simultaneously appeals to taste, hearing, and sight generates sound using a conventional speaker and transmits that sound to the ears through the air. Yet, for greatest novelty, an amusement device should appeal to a given sense in an unexpected or even startling way, such as with sound waves that are not transmitted through the air.

Recently, a mechanism for transmitting sound to the ears that bypasses the air has been determined. Through this mechanism, sound waves are transmitted directly to the ears, without traveling through air, by conduction through an object to the mouth, from which the sound waves travel through the teeth and bones to the ears to be perceived as sound. This process is termed denta-mandibular conduction. Several devices have been designed based on this principle, including a teeth-held head tilt alarm and an underwater communication device. Significantly, none of these devices is directed at amusement. More significantly, none combines appeal to hearing with appeal to taste in the construction of an amusement device or method.

SUMMARY OF THE INVENTION

The present invention addresses these and other shortcomings by providing amusement devices and a method of communication that appeal to the infrequently associated senses of taste and hearing in a novel and unexpected manner.

The amusement devices generally comprise an edible substance and a signal source operatively associated with the edible substance and configured to produce signals representative of sound for transmission to the edible substance. The edible substance, in turn, can transmit these signals to a user's mouth upon contact with the mouth, so that the signals may travel from the mouth through the user's teeth and bones to the user's ears, where they are perceived as sound. Little or no sound is perceived unless the device is in contact with the user's mouth, so that the device is not disturbing to others.

An alternative embodiment of the invention includes a signal source, a holder to receive and hold an edible substance, and a connection between the signal source and the holder configured to transmit signals from the signal source through the user's mouth to the user's ears.

The edible substance generally comprises any substance a user can place in the mouth and consume.

The signal source generally comprises any source configured to produce signals representative of sound. These signals may be sound waves themselves, or they may be electrical signals suitable for conversion into sound waves by a transducer present in some embodiments of the invention. The signal source may be an electronic or piezoelectric device, and it may further include a dampened speaker operatively connected to the edible substance. The electronic device may include a power supply, a switch, and/or a housing.

A significant aspect of the invention is that the novelty of the associated amusement devices is ensured by the nearly limitless combinations of edible substances and sound signals that may employed. For example, the edible substance may include lollipops, other substantially rigid substances, or substances specifically configured for contact with a user's teeth. The sound signals may include music, noises, or spoken words.

The invention further may comprise a connection between the edible substance and the signal source, whereby signals from the signal source may be transmitted to the edible substance. Depending on the nature of the signal produced by the signal source, the invention further may include a transducer for converting signals into sound waves.

The method of communication provided by the present invention comprises providing an edible substance and a signal source operatively associated with the edible substance, producing signals representative of sound by using the signal source, transmitting the signals from the signal source to the edible substance, and contacting the edible substance to the user's mouth so that the signals travel from the user's mouth to the user's ears where they can be perceived by the user as sound. The step of contacting the edible substance to the user's mouth further may comprise contacting the edible substance to the user's teeth.

The nature of the present invention will be understood more readily after consideration of the drawings and the detailed description of the preferred embodiments that follow.

BRIEF DESCRIPTION OF THE DRAWINGS

FIG. 7 is a front perspective view of the portion shown in FIG. 6.

FIG. 8 is a perspective view of yet another alternative embodiment of an amusement device constructed in accordance with the present invention.

DETAIL DESCRIPTION OF PREFERRED EMBODIMENTS AND BEST MODES OF CARRYING OUT THE INVENTION

Figure 1:
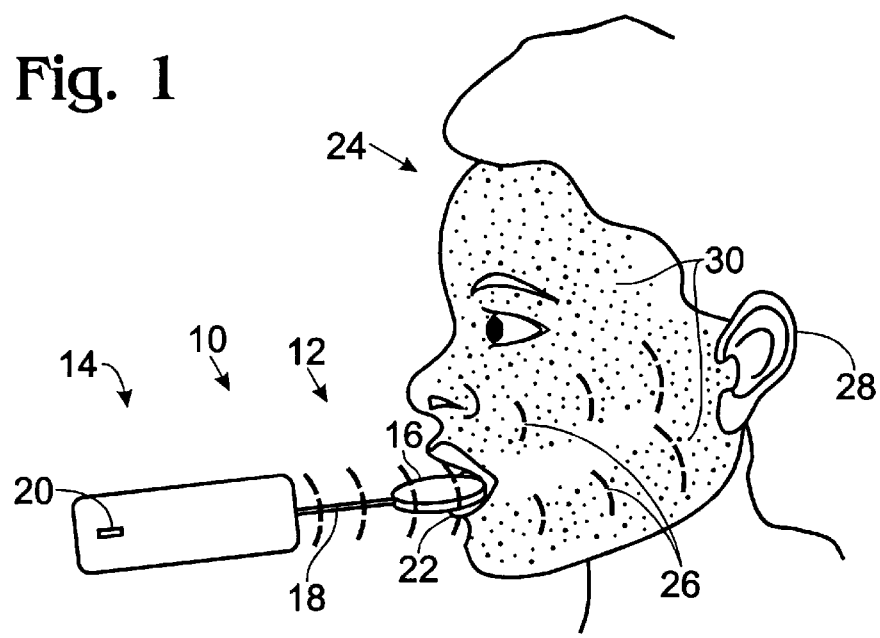
FIG. 1 is a side elevation view of an amusement device constructed in accordance with the present invention, showing the device in use.

FIG. 1 shows an embodiment of an amusement device 10 constructed in accordance with the present invention. Generally, the invention includes an edible substance 12 and a signal source (not visible) operatively associated with the edible substance and configured to produce signals representative of sound for transmission to the edible substance.

In the embodiment shown, a holder 14 is employed to house the signal source and to receive and hold edible substance 12, which may be a lollipop having a candy portion 16 and a stick portion 18. Holder 14 may also provide a switch 20 for actuating the signal source.

Amusement device 10 is used by grasping holder 14 with a hand, actuating the signal source using switch 20, and placing the edible substance in contact with the mouth 22 of a user 24. Mouth 22 can include lips, tongue, gums, palate, teeth, jaws or other structures generally contained within the user's oral cavity. The signal source, or a transducer connected thereto, produces sound waves 26, indicated in FIG. 1 by curved lines that are convex in the direction of propagation. Sound waves 26 travel through edible substance 12 to user's mouth 22, from which they travel through the user's teeth and bones to the user's ears 28, where they are perceived as sound. More specifically, sound waves 26 travel from user's mouth 22 to user's ears 28 at least in part through the denta-mandibular bone structure 30, indicated in FIG. 1 by stippling. The transmission of sound through the denta-mandibular bone structure to the user's ear causes sound to be heard by the user as if the sound was "in the user's head."

Figure 2:
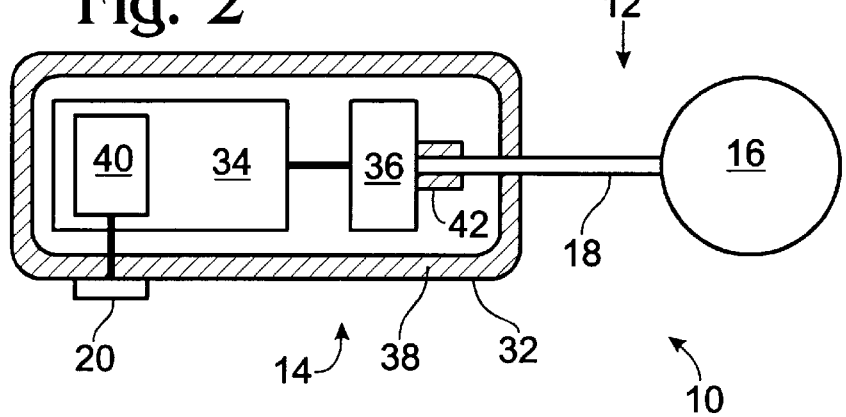
FIG. 2 is a partially schematic, cross-sectional view of the device shown in FIG. 1, showing the operative parts of the invention.

FIG. 2 shows a more detailed view of amusement device 10. Holder 14 includes a housing 32, a signal source 34 surrounded by the housing, and a connection 36. The inside of the housing may be lined with insulation 38 to ensure that little or no sound exits holder 14, except through edible substance 12. The outside of the housing generally is configured to present a pleasing yet functional appearance. Housing 32 may include indentations to make holder 14 easier to grip, or housing 32 may be formed in a shape that complements a preferred edible substance. For example, if the amusement device is intended for use at Christmas, the housing could be shaped like a Santa Claus and configured to receive a candy cane. Any potentially sharp edges on housing 32 may be rounded to minimize hazards associated with unintended impacts.

The signal source generally comprises any source configured to produce signals representative of sound. These signals may be sound waves themselves, or they may be electrical signals suitable for conversion into sound waves by a transducer present in some embodiments of the invention. As used here, the term "sound" refers both (1) to compression waves or vibrations generated by the signal source, or a transducer connected thereto, and (2) to the physiological perception of such compression waves. Such compression waves are transmitted or communicated by material media. The signal source may be an electronic or piezoelectric device, and it may further include a dampened speaker operatively connected to the edible substance. Examples of sound sources include preprogrammed microprocessor chips, musical instruments, radios, and tape or compact disc players. Examples of sounds generated by the sound sources include music, noises, and spoken words.

In amusement device 10, signal source 34 includes a power supply 40 and switch 20. Power supply 40 provides energy to operate signal source 34 and to produce sound waves 26. Switch 20 controls power supply 40, permitting a user to actuate signal source 34 as desired. The preferred power supply is batteries, although any power source may be employed.

The invention further may include a connection 36 between edible substance 12 and signal source 34 whereby the signals produced by the signal source may be transmitted to the edible substance. Connection 36 may comprise a receptor 42 to receive and hold edible substance 12. If signal source 34 produces sound waves, connection 36 may be any material substance capable of conducting sound waves. If signal source 34 does not produce sound waves, but instead produces an electrical signal, the invention may further comprise a transducer to convert the electrical signals to sound waves. Such a transducer would be operatively situated between signal source 34 and edible substance 12.

In some embodiments of the invention, the holder and/or connection may be configured such that the holder, connection, and/or the edible substance may be placed in contact with the user's mouth to transmit sound and thereby practice the invention. For example, a holder may hold an edible substance while also providing a portion of the holder for contact with a user's mouth and teeth.

Edible substance 12 generally comprises any substance a user can place in the mouth and consume. For example, the edible substance may include lollipops, other substantially rigid substances, or substances specifically configured for contact with a user's teeth. The edible substance need not have a uniform composition; for example, a preferred-edible substance is a lollipop sold under the trademark TOOTSIE ROLL POP, which has a chewy interior surrounded by a hard candy exterior.

Figure 3:
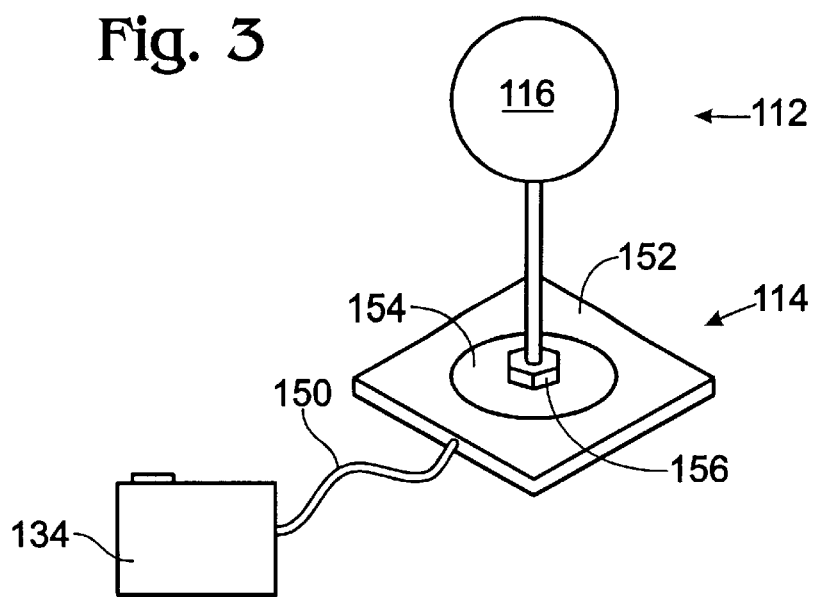
FIG. 3 is a partially schematic, isometric view of an alternative embodiment of an amusement device constructed in accordance with the present invention.
Figure 4:
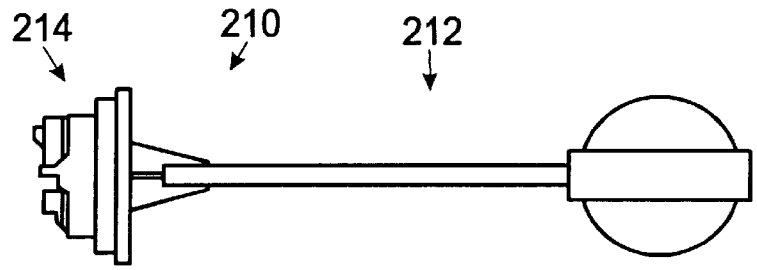
FIG. 4 is a side elevation view of yet another alternative embodiment of an amusement device constructed in accordance with the present invention.
Figure 5:
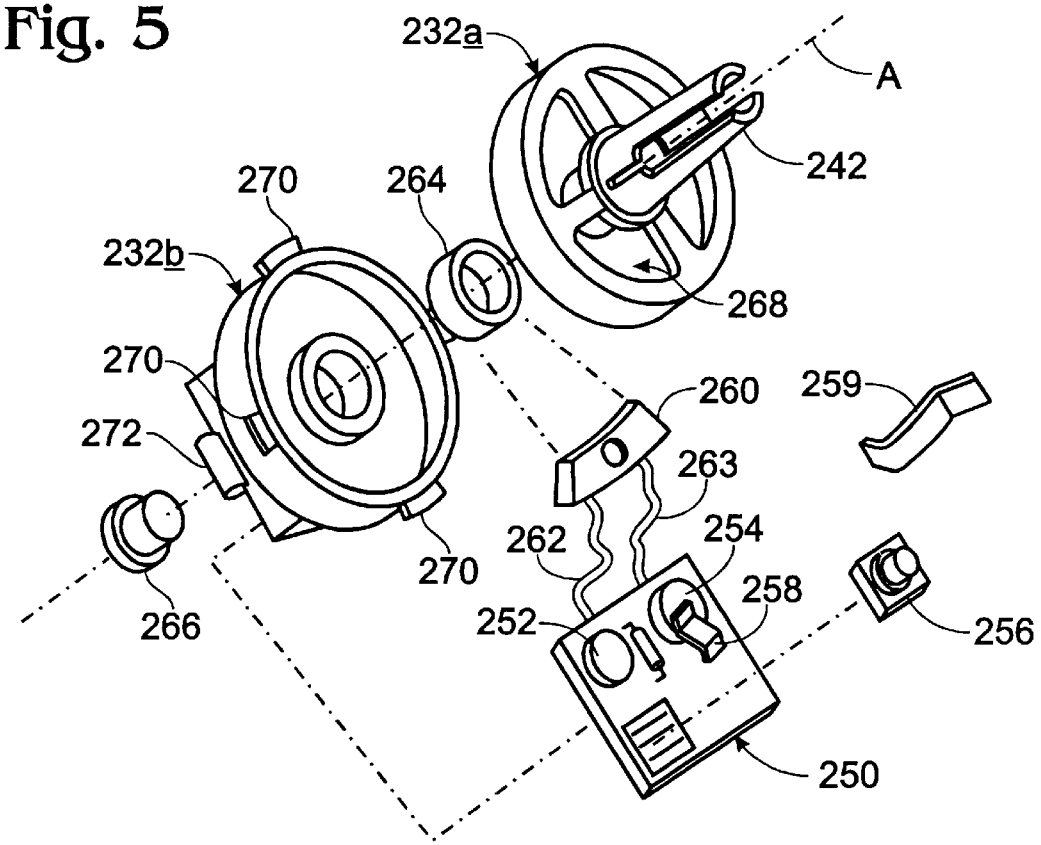
FIG. 5 is an exploded perspective view of the device shown in FIG. 4.
Figure 6:
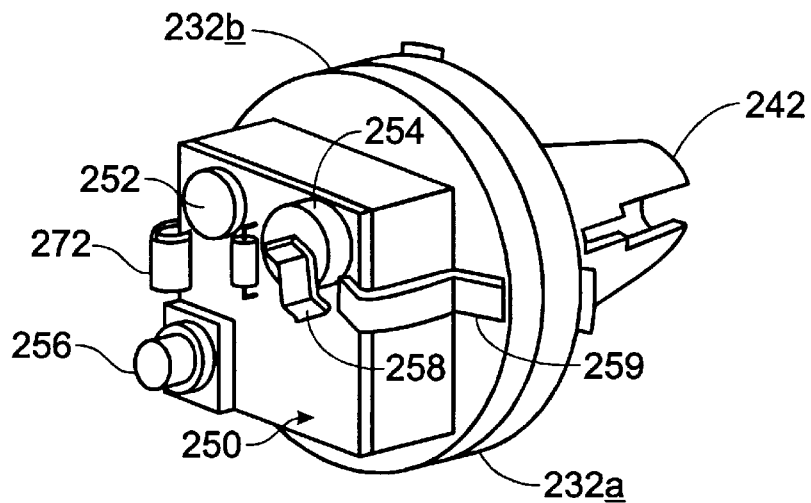
FIG. 6 is a rear perspective view of a portion of the device shown in FIG. 5.

FIG. 3 shows an alternative embodiment of the invention. In this embodiment, the signal source 134 is connected to a holder 114 for the edible substance 112 by a flexible wire 150. The flexible connection between signal source 134 and edible substance 112 is employed to permit a greater variety of signal sources to be used with the invention. For example, signal source 134 may be a radio, compact disk or tape player, or a musical instrument, wherein flexible wire 150 is plugged into a standard output jack positioned in the signal source.

The nature of flexible wire 150 depends on the nature of the signals produced by the signal source. If signal source 134 produces sound waves, then flexible wire 150 must be capable of acoustic transmission; an example of such a wire is a hollow, small-bore, air-filled tube. Alternatively, if signal source 134 produces an electrical signal, then flexible wire 150 must be capable of electrical transmission; an example of such a wire is standard copper or aluminum electrical wire. In the embodiment shown in FIG. 3, signal source 134 produces electrical signals, and flexible wire 150 is a simple two-wire electrically conductive cable.

Holder 114 includes a base 152, a transducer 154, and a vertical support 156 configured to receive and hold edible substance 112. Transducer 154 may be integrally incorporated into base 152, so that the two components form a substantially planar unit. Vertical support 156 is mounted to the face of transducer 154 and serves three functions: (1) receiving and holding edible substance 112, (2) transmitting the sound waves produced by transducer 154 into the edible substance, and (3) inhibiting or dampening transmission of sound waves produced by the transducer into the air.

In one holder, the base and transducer comprise an 8 ohm, 0.4 watt speaker, such as a model TS-30 speaker marketed by Fuji. Such a speaker converts the electrical signals received from signal source 134 through flexible wire 150 into sound waves. The vertical support comprises a simple hexagonal nut having an approximately one-eighth inch threaded opening for receiving and holding the edible substance. The nut is attached to the speaker using suitable mounting means, such as glue.

Holder 114 can be configured to operate with a variety of edible substances. In the shown embodiment, holder 134 is again configured to engage a lollipop. Note that the discoidal candy portion of the lollipop 16 in FIGS. 1 and 2 has been replaced with a spherical candy portion 116 in this and subsequently shown embodiments.

FIGS. 4–7 show yet another alternative embodiment of the invention. In this embodiment, an edible substance 212 is connected to a holder 214 to form an amusement device 210, in which the signal source is an electronic device, specifically a battery-powered printed circuit board that is coupled to a voice coil transducer.

The heart of the signal source is a substantially planar printed circuit board 250. Mounted to printed circuit board 250 are a microprocessor chip 252, a battery 254, and a switch 256. Battery 254 is held in place by a strip 258. A terminal printed circuit board 260 is connected to one side of printed circuit board 250 by wires 262, 263. Terminal printed circuit board 260 engages a voice coil 264 that is biased by a magnet 266.

The components described above are mounted to a two-piece housing, which has a substantially circular cross section perpendicular to an axis A. A front housing 232a is configured to receive and hold edible substance 212 through a receptor 242, and to receive voice coil 264. Front housing 232a also includes a series of open windows 268. A rear housing 232b is configured to receive magnet 266, as well as printed circuit board 250 and those components attached to it. Front housing 232a may be mated with rear housing 232b and held in place using snap tabs 270. Printed circuit board 250 is held in place further by a strip 259 and printed circuit board clip 272.

Amusement device 210 is used as follows. Switch 256 is used to actuate chip 252, which produces electronic signals representative of sound. These electronic signals cause voice coil 264 to vibrate, producing sound waves. These sound waves are transmitted to edible substance 212 through receptor 242 and will be heard by a user when edible substance 212 is placed in contact with the user's mouth.

FIG. 8 shows yet another alternative embodiment of the invention. Externally, this embodiment resembles the embodiment in FIGS. 1 and 2. Specifically, an edible substance 312 is connected to a holder 314 to form an amusement device 310, in which the signal source is a mechanical music box 334. The mechanical music box generates sound waves directly, taking the place of the electronic signal source and transducer in the embodiments discussed above. Although a music box is described, other mechanical sound generators also may be used in this embodiment.

Music box 334 contains a gear-driven, rotating pin drum 350 and a tine harp 352. Pin drum 350 is substantially cylindrical, having a long axis B, and includes outwardly projecting pins 354 located at preselected positions over the surface of the cylinder. Pin drum 350 may rotate about axis B during use. Tine harp 352 resembles a comb, having a strip 356 that supports a row of downwardly projecting fines 358. Pin drum 350 and tine harp 352 are preferably formed of hard substances, such as metal, and are mounted on a base frame 360 and enclosed within a housing 332.

Music box 334 produces sound by causing pin drum 350 to rotate such that pins 354 "pluck" a preselected series of tines 358 on tine harp 352. Plucking constitutes sequentially engaging and disengaging the tines to cause them to vibrate, setting up sound waves. When so plucked, each tine produces a different sound, due to differences in the resonance determined by length, width, and/or rigidity of the tines. These sounds propagate through tine harp 352 and base frame 360 to a receptor 342, from which they are transmitted to edible substance 312.

Pin drum 350 is turned by a drive mechanism 362. The drive mechanism uses energy that the user provides by turning a wind key 364 mounted to housing 332. A governor 366 controls the rate at which pin drum 350 turns.

The amusement device in FIG. 8 is used like the amusement device in FIGS. 1 and 2, as described above. A switch or pin 320 mounted on the housing is used to actuate the music box, and edible substance 312 is placed in contact with the mouth for the user to hear the sounds.

A significant aspect of the invention is that the novelty of the associated amusement devices is ensured by the nearly limitless combinations of edible substances and sound signals that may employed. For example, amusement devices may be configured for holidays and special occasions using fixed, preprogrammed signals. A candy cane may transmit festive holiday songs, such as Jingle Bells, Silent Night, or White Christmas. Halloween candy may transmit ghoulish screams that would seemingly inhabit a user's head. A piece of candy may transmit a personalized birthday message, previously recorded by a giver for private playback inside a receiver's head.

Alternatively, amusement devices may be configured to receive variable, radio signals. These signals may originate from commercial AM/FM radio stations, or they may originate from dedicated transmitters, broadcasting at special frequencies. For example, the invention may be used to "listen" to the radio without disturbing others, where an edible substance is used to transmit signals to the ears in lieu of headphones. Alternatively, items such as candy may be used to listen to game information broadcast by dedicated transmitters at sporting events. Similarly, various edible substances may be used to listen to exhibit information at fairs, parks, or zoos.

Another significant aspect of the present invention involves safety. Many amusement devices have short shelf lives due to recalls prompted by safety concerns, such as those posed by electrical shock or unintended ingestion. The amusement device offered by the present invention circumvents these shortcomings by isolating the electrical components from the user's body, and by ensuring that the component of the invention that contacts the user's mouth is edible.

The method of communication provided by the present invention comprises providing an edible substance and a signal source operatively associated with the edible substance, producing signals representative of sound by using the signal source, transmitting the signals from the signal source to the edible substance, and contacting the edible substance to the user's mouth so that the signals travel from the user's mouth to the user's ears where they can be perceived by the user as sound. The step of contacting the edible substance to the user's mouth further may comprise contacting the edible substance to the user's teeth. The power of the method lies in its novelty, its ability to be enjoyed without disturbing others, and its flexibility, as described above.

While preferred embodiments and best modes for practicing the invention have been described, modifications and changes may be made thereto without departing from the spirit of the invention. Other embodiments include drinking straws, cups, glasses, drink containers, eating utensils or food containers which convey sound during drinking or eating. Still other embodiments include a pen or pencil which includes a signal source as described and a sound transfer device for contact with a user's mouth to communicate sound to the user.

We claim:

1. An amusement device to communicate sound to a user by the transmission of vibrations through the user's teeth to the user's ear, the device comprising:
   an edible substance;
   a signal source configured to produce sound vibrations; and
   a connection between the edible substance and the signal source whereby the vibrations may be transmitted from the signal source to the edible substance to cause the edible substance to vibrate;
   where the edible substance can transmit the vibrations to the user's teeth upon contact of the edible substance with the teeth, so that the vibrations travel from the teeth to the user's ear where they are perceivable by the user as sound;
   where vibrations transmitted from the signal source to the edible substance are sufficient to be perceivable by the user as sound when the edible substance is in contact with the user's teeth; and
   where the sound perceivable by the user from the vibrations produced by the signal source is predominantly from vibrations transmitted from the edible substance through the user's teeth to the user's ear rather than from vibrations from the signal source that otherwise may be transmitted to the user's ear.

2. The amusement device of claim 1 where the edible substance comprises a lollipop with a candy portion and a stick portion, where the connection comprises a holder into which the lollipop's stick portion is placed, and where the holder is operatively associated with the signal source.

3. The amusement device of claim 1 where the edible substance is substantially rigid.

4. The amusement device of claim 1 where the edible substance is configured for contact with the user's teeth.

5. The amusement device of claim 1 where the signal source is an electronic device.

6. The amusement device of claim 5 where the electronic device includes a power supply and a switch to actuate the production of signals.

7. The amusement device of claim 6 further comprising a housing for the electronic device.

8. The amusement device of claim 1 where the signal source comprises a piezoelectric.

9. The amusement device of claim 1 where the signal source includes a speaker having a movable portion to produce the vibrations, and where the connection includes a receptor associated and moveable with the movable portion of the speaker where the receptor is configured to transmit the vibrations to the edible substance.

10. The amusement device of claim 1 where the signal source includes a transducer having a movable portion to produce the vibrations, and where the connection includes a receptor associated and moveable with the movable portion of the transducer, where the receptor is configured to transmit the vibrations to the edible substance.

11. An amusement device to communicate sound to a user by the transmission of signals through the user's teeth to the user's ear, the device comprising:
    an edible substance;
    signal means for producing sound vibrations; and
    connection means associated with the edible substance and the signal means, for transmitting the vibrations from the signal means to the edible substance;
    where the edible substance can transmit the vibrations to the user's teeth upon contact of the edible substance with the teeth, so that the vibrations travel from the teeth to the user's ear where they are perceivable by the user as sound;
    where vibrations transmitted from the signal means to the edible substance are sufficient to be perceivable by the user as sound when the edible substance is in contact with the user's teeth; and
    where the sound perceivable by the user from the vibrations produced by the signal means is predominantly from vibrations transmitted from the edible substance through the user's teeth to the user's ear rather than from vibrations from the signal means that otherwise may be transmitted to the user's ear.

12. An amusement device to communicate sound to a user by the transmission of vibrations through the user's teeth to the user's ear, the device comprising:
    a housing;
    a transducer within the housing, where the transducer includes a moveable portion configured to produce sound vibrations;

a receptor associated and moveable with the moveable portion of the transducer; and an element that includes an edible substance, where the element is held by the receptor;

where vibrations may be transmitted from the moveable portion to the edible substance to cause the edible substance to vibrate, so that the edible substance can transmit the vibrations to the user's teeth upon contact of the edible substance with the teeth; and where the vibrations transmitted to the edible substance and from the edible substance to the user's teeth are sufficient to be perceivable by the user as sound.

* * * * *